(No Model.)  2 Sheets—Sheet 1.

W. G. VERNON.
BAND SAW MACHINE.

No. 284,580. Patented Sept. 4, 1883.

Witnesses:

Inventor:
William G. Vernon
By Connolly Bro
Atty

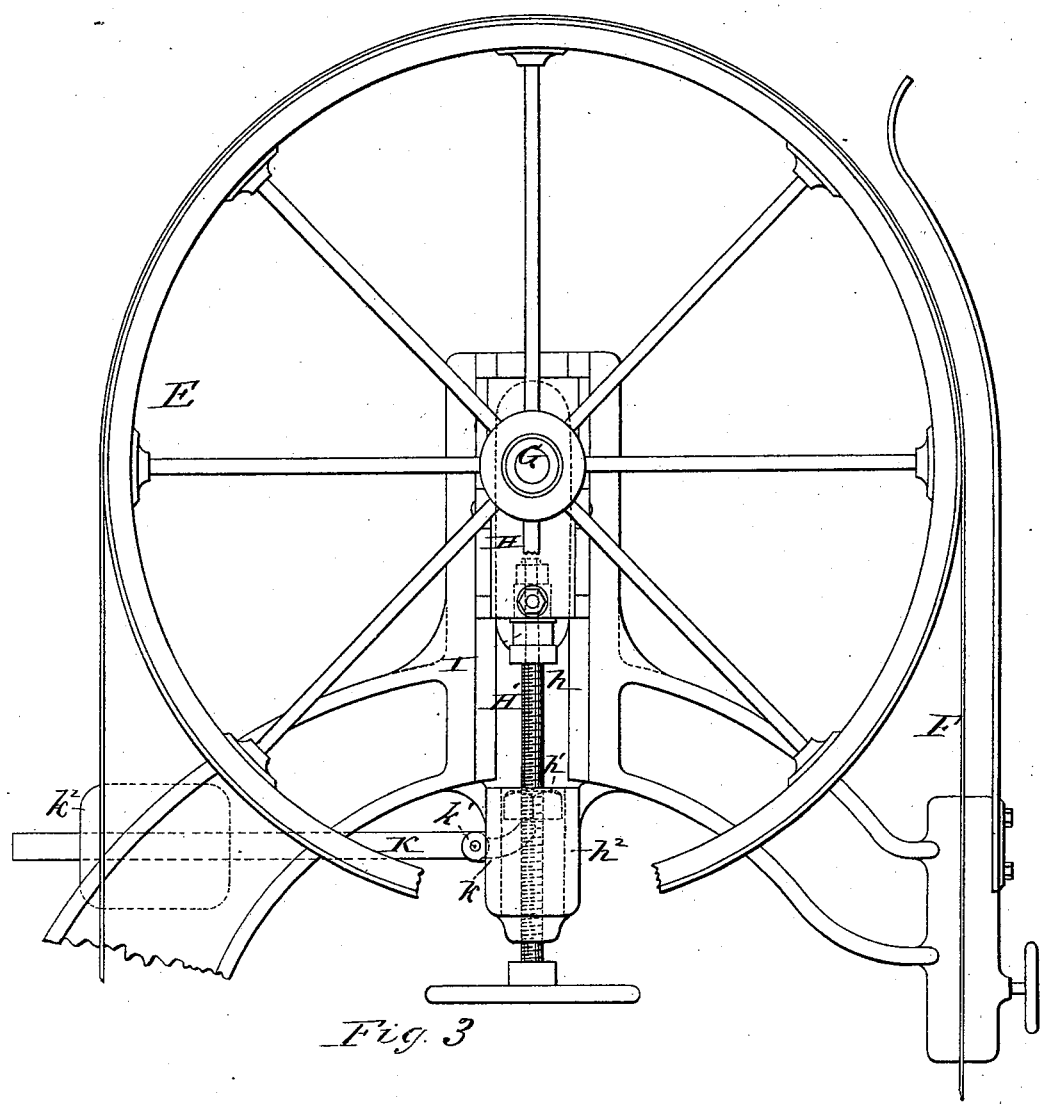

UNITED STATES PATENT OFFICE.

WILLIAM G. VERNON, OF PHILADELPHIA, PENNSYLVANIA, ASSIGNOR TO GOODELL & WATERS, OF SAME PLACE.

BAND SAW MACHINE.

SPECIFICATION forming part of Letters Patent No. 284,580, dated September 4, 1883.

Application filed May 28, 1883. (No model.)

*To all whom it may concern:*

Be it known that I, WILLIAM G. VERNON, a citizen of the United States, residing at Philadelphia, in the county of Philadelphia and State of Pennsylvania, have invented certain new and useful Improvements in Band Saw Machines; and I do hereby declare the following to be a full, clear, and exact description of the invention, reference being had to the accompanying drawings, which form part of this specification, in which—

Figure 1:
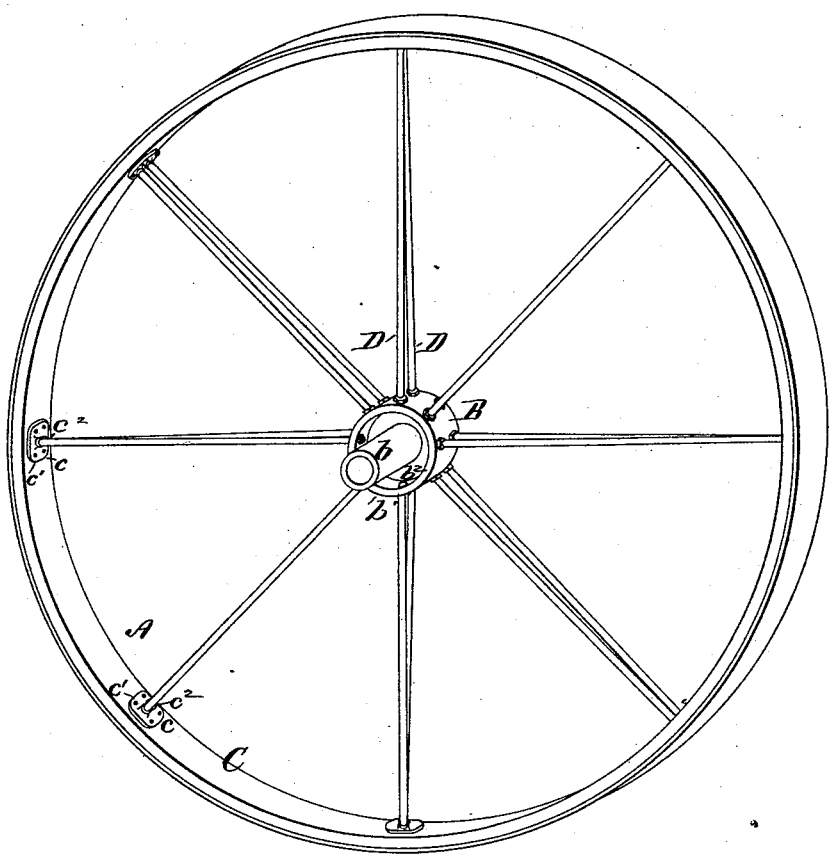
Figure 2:
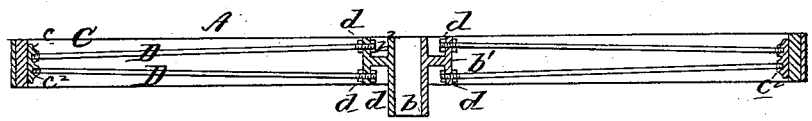

Figure 1 is a perspective of band saw wheel. Fig. 2 is a section of same. Fig. 3 is a side elevation, partly broken away, of band saw machine.

My invention has for its object to provide a band saw wheel which shall be light but strong and durable, and which shall be capable of adjustment to correct any irregularity of the rim or periphery due to shrinkage, expansion, or other cause.

A further object of my invention is to provide means for securing the required tension of the blade of the saw.

My improvements consist, first, in the peculiar construction and combination of parts hereinafter described, comprising a wheel the hub and rim of which are connected by double-rod spokes having threaded ends provided with nuts, whereby adjustment may be effected, as hereinafter fully explained; and secondly, in the combination, with the bearing of a band saw wheel, of a spring and a weight, as hereinafter set forth.

Referring to the accompanying drawings, A indicates a band saw wheel embodying the first part of my invention. This wheel comprises a hub, B, rim or felly, C, and double-rod spokes D D. The hub B is metallic, and preferably a casting comprising a central collar or tube, $b$, to which the arbor is to be keyed, a surrounding cylinder or shell, $b'$, to which the inner ends of the spokes D D are secured, and a diaphragm or web, $b^2$, which unites said collar and cylinder. The rim C is a wooden felly covered with leather or india-rubber. To the inside of the rim, at regular intervals apart, are applied bracket-plates $c\ c$, fastened by screws $c'\ c'$, and having internally-threaded bosses or openings $c^2\ c^2$ for the reception of the ends of the spoke-rods D D. Each spoke consists of two rods, D D, whose outer ends are fastened in the plates $c\ c$, their inner ends being secured to the hub B by nuts $d\ d$, one nut on each rod being inside the cylinder $b'$ and the other outside of said cylinder. These rods are parallel, and in the same plane as viewed from the side of the wheel, but are inclined toward each other very slightly, so as to be nearer together at their outer than at their inner ends. In practice they should be, say, an inch and a quarter apart at their bases on the hub, and, say, seven-eighths of an inch apart at their opposite extremities. My invention, however, is not limited to exact measurements or degree of inclination, nor to inclining the rods toward each other, as the angle of inclination may be varied; or the rods comprising each spoke may be equidistant from each other throughout their entire lengths. The rods, when inclined as described, act as braces, and the method of attachment to the hub permits either one or both of said rods to be adjusted, either by shortening or lengthening, to correct any unevenness or untrueness in the rim due to expansion, contraction, or other cause.

Fig. 3 illustrates the second part of my invention, wherein E is the upper wheel of a band saw machine, and F the saw-blade thereon. Said wheel is keyed on an arbor, G, having its bearing in a sliding box, H, sustained on a screw-spindle, H'. This spindle is provided with a nut, $h'$, fitted inside a fast or stationary collar, $h^2$, and below said nut it is embraced by the forked arms $k\ k$ of a bifurcated lever, K, fulcrumed at $k'$. Said lever has at its opposite end a weight, $k^2$, by which means the requisite tension of the saw-blade is maintained. Said weighted lever has heretofore been employed, and hence it is not, in itself, herein claimed as my invention; but it has been objected that the weight does not act quick enough in some cases to regulate the tension, and accordingly, as an adjunct or accessory, I provide a spring, I, which encircles the spindle between its collar $h$ and the box H, so as to exert upward pressure against the latter and afford an elastic bearing therefor. The advantage of employing both the weight and spring is that the weight produces a uniform tension at all times, and compensates for expansion and contraction of the saw-blade, owing to variations in temperature; but it acts slowly, as it has to overcome inertia in starting, and to produce even a slight motion of the spindle has, owing to its distance from the lever-fulcrum, to move through a considerable space. The spring, on the contrary, acts instantly, and compensates sudden strains. In other words, the weight produces a uniform and constant tension of the saw-blade for normal conditions, and the spring compensates for changes in tension, due to differences in the stock worked and to twisting and bending of the saw-blade in making short turns.

What I claim as my invention is as follows:

1. In a band saw wheel, the combination, with the hub composed of a central spindle-collar, an external cylinder, and an intermediate connecting-web, of a rim having bracket-plates to receive the spokes, and a series of double spokes connecting the rim and hub, and inclined toward each other on radial lines, said spokes being provided with means of adjustment, substantially as described.

2. The combination, with a band saw wheel, of a vertically-sliding bearing, guides upon which the same slide, a weighted lever supported by the band saw frame and arranged to act upon said bearing, and a spring located below said bearing and operating substantially as described.

In testimony that I claim the foregoing I have hereunto set my hand this 23d day of May, 1883.

WILLIAM G. VERNON.

Witnesses:
ANDREW ZANE, JR.,
WM. H. POWELL.